United States Patent
Jin et al.

(10) Patent No.: US 8,704,986 B2
(45) Date of Patent: Apr. 22, 2014

(54) METHOD OF MANUFACTURING A LIQUID CRYSTAL DISPLAY DEVICE WITH FIRST TO THIRD SUBPIXELS DRIVEN IN A TN MODE AND A FOURTH SUBPIXEL DRIVEN IN ECB MODE

(75) Inventors: Hyun Suk Jin, Paju-si (KR); Hyung Seok Jang, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 72 days.

(21) Appl. No.: 13/592,120

(22) Filed: Aug. 22, 2012

(65) Prior Publication Data

US 2012/0315817 A1 Dec. 13, 2012

Related U.S. Application Data

(62) Division of application No. 11/957,913, filed on Dec. 17, 2007, now Pat. No. 8,269,934.

(30) Foreign Application Priority Data

Dec. 18, 2006 (KR) .............................. 2006-129257

(51) Int. Cl.
*G02F 1/1337* (2006.01)
(52) U.S. Cl.
USPC .......................................... 349/128; 349/129
(58) Field of Classification Search
USPC .......................................... 349/128–129, 179
See application file for complete search history.

(56) References Cited

U.S. PATENT DOCUMENTS

| | | | |
|---|---|---|---|
| 6,323,926 B2 | 11/2001 | Watanabe et al. |
| 7,199,808 B2 | 4/2007 | Yo |
| 2004/0095521 A1 | 5/2004 | Song et al. |
| 2006/0001809 A1 | 1/2006 | Lee et al. |
| 2006/0050203 A1 | 3/2006 | Choi |
| 2006/0125991 A1 | 6/2006 | Lee |
| 2007/0040975 A1 | 2/2007 | Momoi |

FOREIGN PATENT DOCUMENTS

| | | |
|---|---|---|
| CN | 1916705 A | 2/2007 |
| JP | 08-030244 | 2/1996 |
| JP | 2004-133334 | 4/2004 |
| KR | 1999-0039687 | 6/2000 |

OTHER PUBLICATIONS

Office Action issued in corresponding Chinese Patent Application No. 200710300103.X; issued Aug. 28, 2009.
Office Action issued in corresponding Korean Patent Application No. 10-2006-0129257, mailed Apr. 26, 2013, 6 pages.

*Primary Examiner* — Jessica M Merlin
(74) *Attorney, Agent, or Firm* — Brinks Gilson & Lione

(57) ABSTRACT

A liquid crystal display device and a method of manufacturing the liquid crystal device are disclosed. The liquid crystal display device includes a red subpixel, a green subpixel, a blue subpixel, and a viewing angle controlling subpixel. The red, green, and blue subpixels are driven in a TN method, and the viewing angle controlling subpixel is driven in an ECB method. Therefore, the liquid crystal display device provides flexibility in a security range to a user, and not only can be used for one person but also can be used for two or more persons to view an image of high quality without inconvenience while securing security.

6 Claims, 14 Drawing Sheets

<Related Art>

| SECOND TRANSMISSION AXIS OF SECOND POLARIZER | ↕ 90° | |
|---|---|---|
| | Pr,Pg,Pb | Pv |
| ALIGNMENT DIRECTION OF SECOND ALIGNMENT LAYER | ↗ +45° | ↑ +90° |
| ALIGNMENT DIRECTION OF FIRST ALIGNMENT LAYER | ↙ -45° | ↓ -90° |
| FIRST TRANSMISSION AXIS OF FIRST POLARIZER | ↔ 0° | |

<WIDE VIEWING ANGLE MODE>

<WIDE VIEWING ANGLE MODE>

<NARROW VIEWING ANGLE MODE>

<NARROW VIEWING ANGLE MODE>

METHOD OF MANUFACTURING A LIQUID CRYSTAL DISPLAY DEVICE WITH FIRST TO THIRD SUBPIXELS DRIVEN IN A TN MODE AND A FOURTH SUBPIXEL DRIVEN IN ECB MODE The present patent document is a divisional of U.S. patent application Ser. No. 11/957,913, filed Dec. 17, 2007 now U.S. Pat. No. 8,269,934, which claims priority to Korean Patent Application No. 10-2006-129257 filed in Korea on Dec. 18, 2006.

BACKGROUND

1. Field of the Invention

The present disclosure relates to a liquid crystal display device and a method for manufacturing the same.

2. Discussion of the Related Art

A liquid crystal display (LCD) device, which is one of flat display devices recently drawing attention, is a device for applying an electric field to liquid crystals having both fluidity of liquid and an optical property of crystal to change optical anisotropy. Since the LCD device has low power consumption and a small volume, and can be made to have high definition in a large size, it is widely used.

Up to now, researches on an LCD device allowing a wider viewing angle is under active development, but recently, researches have also started working on an LCD device having a narrow viewing angle as well as a wide viewing angle is under active development.

For example, in the case where an LCD device is used for protecting company secret or the privacy of an individual, information may leak to or the privacy can be violated by a person positioned at an adjacent location when the LCD device has only a wide viewing angle.

For this reason, recently, technology for allowing an LCD device to be viewed in a desired viewing angle at a desired time by controlling the LCD device is under active development.

FIG. 1 is a cross-sectional view illustrating a related art LCD device that can operate in a wide viewing angle mode and a narrow viewing angle mode.

Referring to FIG. 1, the related art LCD device includes a first liquid crystal (LC) panel 11 and a second LC panel 12 attached to each other.

The first LC panel 11 includes a first substrate 10 and a second substrate 20 separated by a predetermined distance, facing, and attached to each other. A first LC layer 30 is interposed between the first substrate 10 and the second substrate 20.

Though not shown, thin film transistors (TFTs) and pixel electrodes can be formed on the inner surface of the first substrate 10, and color filters and a common electrode can be formed on the inner surface of the second substrate 20.

The second LC panel 12 is formed on the outer surface of the second substrate 20.

The second LC panel 12 includes a third substrate 50 and a fourth substrate 60 separated by a predetermined distance, facing, and attached to each other. A second LC layer 70 is interposed between the third substrate 50 and the fourth substrate 60.

Though not shown, a first electrode and a second electrode are formed on the inner surfaces of the third and fourth substrates 50 and 60, respectively. The first and second electrodes are connected to a predetermined controller to apply an electric field to the second LC layer 70.

The second LC layer 70 is aligned horizontally or vertically by the applied electric field.

A first polarizer 81 is formed on the outer surface of the first substrate 10 of the first LC panel 11, and a second polarizer 82 is formed on the outer surface of the fourth substrate 60 of the second LC panel 12.

At least one polarizer can be further provided between the first LC panel 11 and the second LC panel 12.

During a wide viewing angle mode, the second LC panel 12 directly passes an image generated by the first LC panel 11 regardless of application of an electric field to the second LC layer 70.

During a narrow viewing angle mode, a predetermined electric field is applied or not applied to the second LC panel 12 to pass light processed by the second LC panel 12 in only a predetermined direction. Therefore, an image that is generated by the first LC panel 11 and passes through the second LC panel 12 can be viewed at a specific narrow viewing angle.

As descried above, in the case where a viewing angle controlling LC panel is attached on a main LC panel providing a primary image to control the viewing angle of a related art LCD device, the viewing angle controlling LC panel not only should be additionally manufactured but also the thickness and weight of a product increase three times or more.

Also, misaligning can be generated while the viewing angle controlling LC panel and the main LC panel are attached to each other. Since light incident from a backlight unit should always pass through the viewing angle controlling LC panel during a wide viewing angle mode, front brightness considerably reduces.

BRIEF SUMMARY

Embodiments provide a liquid crystal display device that allows a user to selectively view a screen in a wide viewing angle, and a narrow viewing angle, and, a method for manufacturing the same.

In one embodiment, a liquid crystal display device includes: a first substrate where first to fourth subpixel regions are defined; a second substrate facing the first substrate, and where the first to fourth subpixel regions are defined; a first alignment layer aligned to a first direction in the first to third subpixel regions, and aligned to a third direction different from the first direction in the fourth subpixel region on the first substrate; a common electrode on the second substrate; a second alignment layer aligned to a second direction in the first to third subpixel regions, and aligned to a fourth direction different from the second direction in the fourth subpixel region on the second substrate; and a liquid crystal layer between the first and second substrates.

In another embodiment, a method for manufacturing a liquid crystal display device includes: preparing first and second substrates where first to fourth subpixel regions are defined; forming a first alignment layer on the first substrate; aligning portions of the first alignment layer corresponding to the first to third subpixel regions to a first direction, and aligning a portion of the first alignment layer corresponding to the fourth subpixel region to a third direction different from the first direction; forming a common electrode on the second substrate; forming a second alignment layer on the common electrode; aligning portions of the second alignment layer corresponding to the first to third subpixel regions to a second direction, and aligning a portion of the second alignment layer corresponding to the fourth subpixel region to a fourth direction different from the second direction; and forming a liquid crystal layer between the first and second substrates.

Embodiments provide flexibility in a security range to a user. According to the embodiments, an LCD device can be used not only for one person, and but also for two or more persons without inconvenience. Also, according to the embodiments, an LCD device allows two or more persons to view a high quality image with security.

The details of one or more embodiments are set forth in the accompanying drawings and the description below. Other features will be apparent from the description and drawings, and from the claims.

DETAILED DESCRIPTION OF THE DRAWINGS AND THE PRESENTLY PREFERRED EMBODIMENTS

Reference will now be made in detail to the embodiments of the present disclosure, examples of which are illustrated in the accompanying drawings.

An LCD device according to an embodiment includes a first substrate, a second substrate, and an LC layer between the first and second substrates. The LCD device also includes a red subpixel Pr, a green subpixel Pg, a blue subpixel Pb, and a viewing angle controlling subpixel Pv.

The red subpixel Pr, the green subpixel Pg, and the blue subpixel Pb include red, green, and blue color filters, respectively, and the viewing angle controlling subpixel Pv does not include a color filter, or includes a white color filter.

The red subpixel Pr, the green subpixel Pg, and the blue subpixel Pb are driven in a twisted nematic (TN) method, and the viewing angle controlling subpixel Pv is driven in an electrically controllable birefringence (ECB) method.

The red subpixel Pr, the green subpixel Pg, and the blue subpixel Pb can be normally white.

An LCD device according to an embodiment can have various arrangement configurations in the arrangement order of the red subpixel Pr, the green subpixel Pg, the blue subpixel Pb, and the viewing angle controlling subpixel Pv. For example, the red, green, and blue subpixels Pr, Pg, Pb, and the viewing angle controlling subpixel Pv can be arranged in a quad type of two rows and two columns, or a stripe type of one row.

Also, the LCD device can control a viewing angle by making the alignment direction of the viewing angle controlling subpixel different from that of the red, green, and blue subpixels Pr, Pg, and Pb on an alignment layer to arrange LC molecules, and driving or not driving the viewing angle controlling subpixel Pv.

The red, green, and blue subpixels Pr, Pg, and Pb are driven in a TN method, and the viewing angle controlling subpixel is driven in an ECB method.

Embodiments provide flexibility in a security range to a user. According to the embodiments, an LCD device can be used not only for one person, and but also for two or more persons without inconvenience. Also, according to the embodiments, an LCD device allows two or more persons to view a high quality image with security.

The construction of the present disclosure will be described in more detail and specifically with reference to the accompanying drawings.

The LCD device and the method for manufacturing the same will be described in detail with reference to the accompanying drawings.

Figure 1:
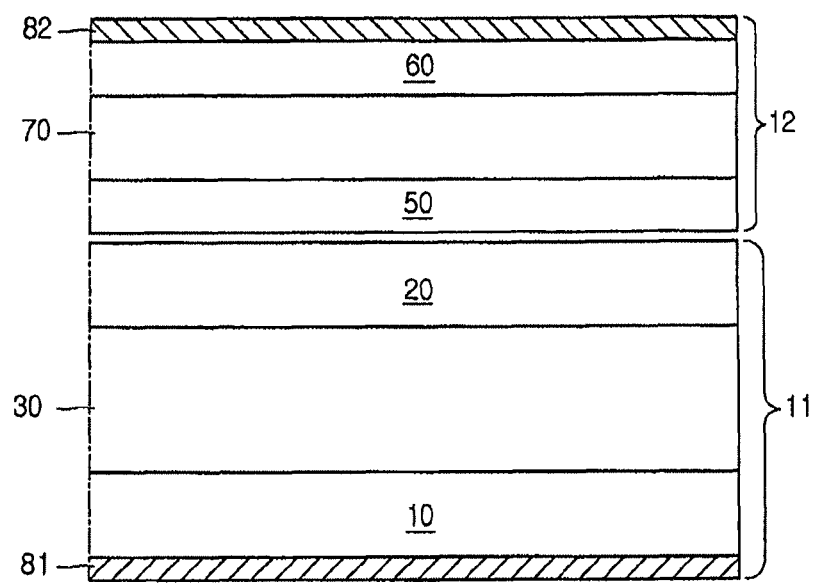
FIG. 1 is a cross-sectional view illustrating a related art LCD device driven in a wide viewing angle mode and a narrow viewing angle mode.
Figure 2:
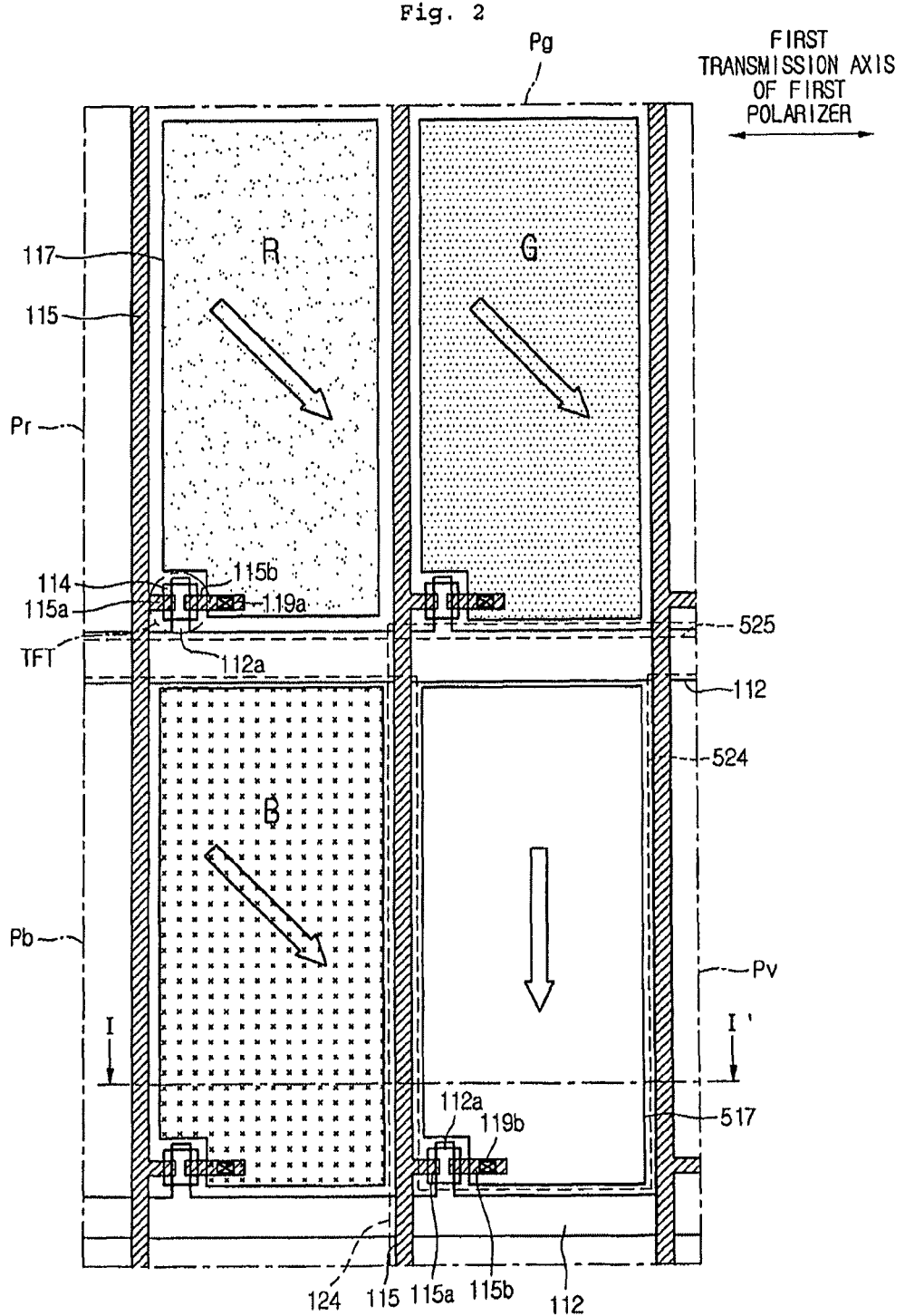
FIG. 2 is a plan view illustrating a first substrate of an LCD device according to an embodiment.
Figure 3:
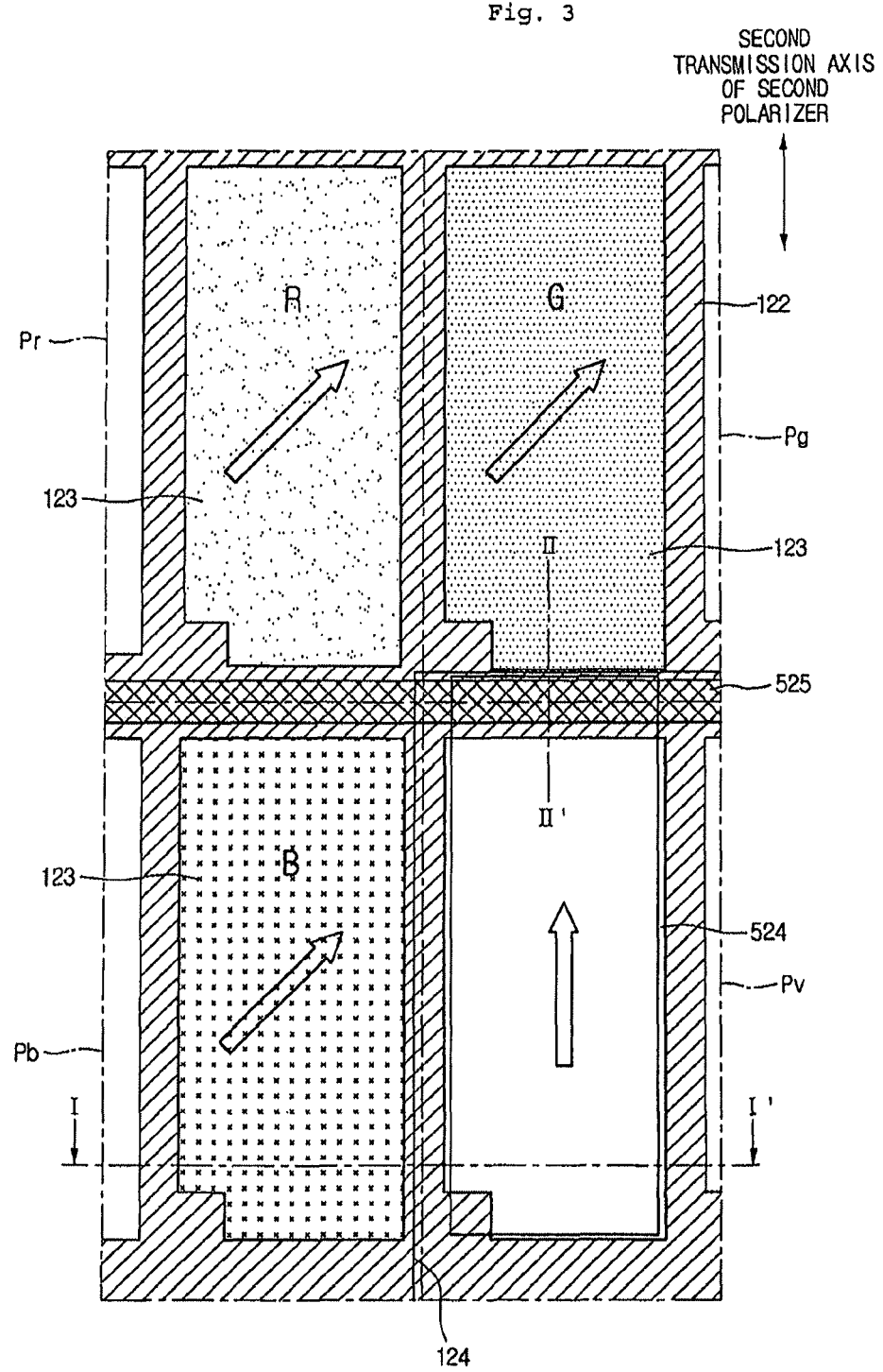
FIG. 3 is a plan view illustrating a second substrate facing the first substrate of the LCD device of FIG. 2.
Figure 4:
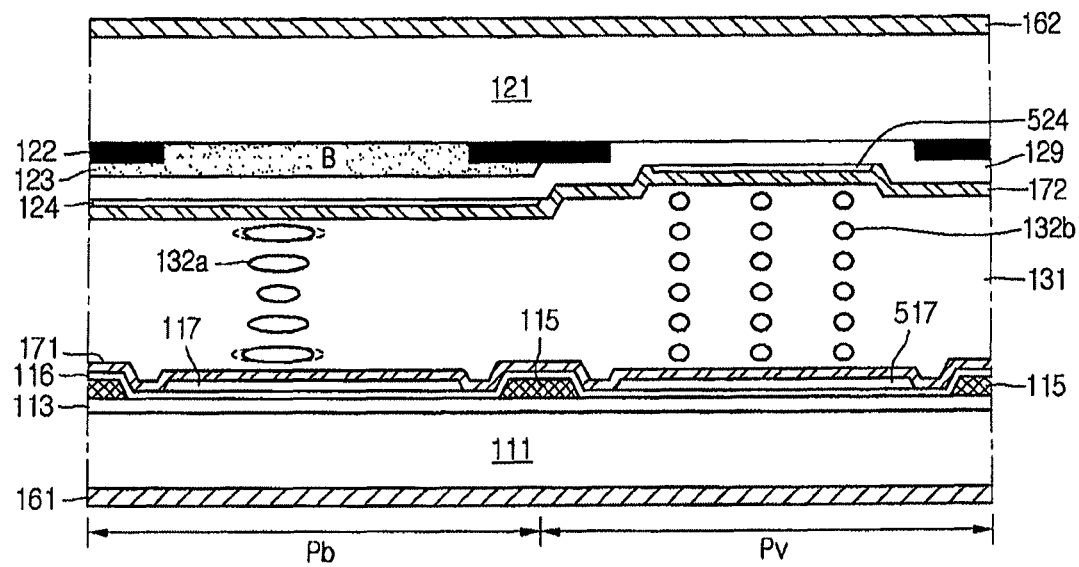
FIG. 4 is a cross-sectional view taken along a line I-I' of FIGS. 2 and 3.

FIG. 2 is a plan view illustrating a first substrate of an LCD device according to an embodiment, FIG. 3 is a plan view illustrating a second substrate facing the first substrate of the LCD device of FIG. 2, and FIG. 4 is a cross-sectional view taken along a line I-I' of FIGS. 2 and 3.

Figure 5:
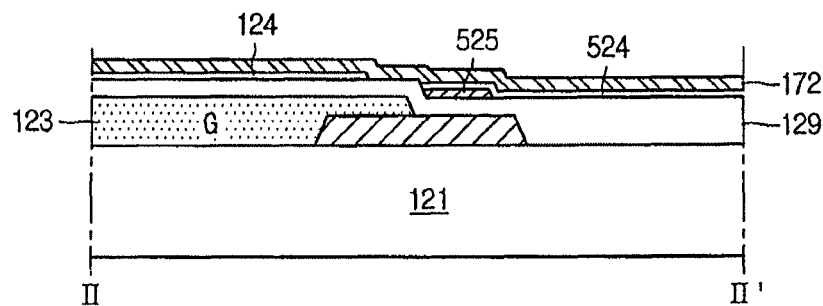
FIG. 5 is a cross-sectional view illustrating a portion of a color filter substrate (upper substrate) in an LC panel according to an embodiment.

Also, FIG. 5 is a cross-sectional view taken along a line II-II' of FIG. 3.

Referring to FIGS. 2 to 4, the LCD device according to an embodiment includes red, green, and blue subpixels Pr, Pg, and Pb, and a viewing angle controlling subpixel Pv. The red, green, and blue subpixels Pr, Pg, and Pb are driven in a TN method, and the viewing angle controlling subpixel is driven in an ECB method.

In the TN method, LC molecules of a nematic state in an LC layer are arranged such that they are continuously twisted along a light transmission direction, and when an electric field is applied, the twisted state of the LC molecules is continuously released and erected, so that the characteristic of transmitted light changes.

When the viewing angle controlling subpixel Pv is in an off-state, the LCD device is driven in a wide viewing angle mode, so that an image realized by the red, green, and blue subpixels Pr, Pg, and Pb can be viewed with high quality at a wide viewing angle.

Here, the fact that the viewing angle controlling subpixel Pv is in the off-state means that the viewing angle controlling subpixel Pv is not driven.

Also, when the viewing angle controlling subpixel Pv is in an on-state, the LCD device is driven in a narrow viewing angle mode. Since light that passes through the viewing angle controlling subpixel Pv serves as light leakage at a lateral viewing angle through an birefringence effect of LC, an image realized by the red, green, and blue subpixels Pr, Pg, and Pb can be viewed at high quality only at a narrow viewing angle, for example, a front viewing angle.

The fact that the viewing angle controlling subpixel Pv is in the on-state means that the viewing angle controlling subpixel Pv is driven.

A viewing angle range may be also controlled by controlling a voltage applied to the viewing angle controlling subpixel Pv.

As illustrated in FIGS. 2 and 4, the first substrate 111 of the LCD device includes a plurality of gate lines 112 each being arranged in a row and a plurality of data lines 115 crossing the gate lines 112. The gate lines 112 and the data lines 115 define the subpixels Pr, Pg, Pb, and Pv.

The gate line 112 includes at least one material of Cu, Al, an aluminum alloy (for example, AlNd), Mo, Cr, Ti, Ta, and MoW.

The data line 115 includes at least one material of Cu, Al, an aluminum alloy (for example, AlNd), Mo, Cr, Ti, Ta, and MoW.

The red, green, and blue subpixels Pr, Pg, and Pb of the subpixels are formed at crossings between the gate lines and the data lines, respectively, and include a TFT for switching a voltage, and a first pixel electrode 117 connected to the TFT.

The viewing angle controlling subpixel Pv of the subpixels is formed at a crossing between the gate line 112 and the data line 115, and includes a TFT for switching a voltage, and a second pixel electrode 517 connected to the TFT and formed inside the viewing angle controlling subpixel Pv.

Each of the first pixel electrode 117 and the second pixel electrode 517 includes at least one of indium-tin-oxide (ITO) and indium-zinc-oxide (IZO).

The TFT includes a gate electrode 112a extending from the gate line 112, a gate insulating layer 113 on the entire surface of the first substrate 111 including the gate electrode 112, a semiconductor layer 114 on a portion of the gate insulating layer 113 on the gate electrode 112a, a source electrode 115a branching off from the data line 115 and formed on one end of the semiconductor layer 114, and a drain electrode 115b separated from the source electrode 115a and formed on the other end of the semiconductor layer 114. The semiconductor layer 114 includes amorphous silicon a-Si and impurity-implanted amorphous silicon n+a-Si.

A passivation layer 116 is formed on the first substrate 111 to cover the TFT. The passivation layer includes a first contact hole 119a and a second contact hole 119b exposing a portion of the drain electrode 115b.

Also, the first pixel electrode 117 is connected to the drain electrode 115b via the first contact hole 119a, and the second pixel electrode 517 is connected to the drain electrode 115b via the second contact hole 119b.

The gate insulating layer 113 is interposed between the gate line 112 and the data line 115.

The gate insulating layer 113 includes at least one of $SiN_x$ and $SiO_x$.

The passivation layer 116 includes at least one of $SiN_x$ and $SiO_x$.

Also, the passivation layer 116 may include at least one of benzocyclobutene (BCB) and acryl-based material.

A first alignment layer 171 is formed on the front surface of the first substrate.

Portions of the first alignment layer 171 corresponding to the red, green, and blue subpixels Pr, Pg, and Pb are aligned to a first alignment direction, and a portion of the first alignment layer 171 corresponding to the viewing angle controlling subpixel Pv is aligned to a third alignment direction.

An angle difference between the first alignment direction and the third alignment direction may be ±45°.

Referring to FIGS. 3 and 4, a black matrix 122 is formed on a region of the second substrate 121 facing the first substrate 111, which corresponds to a TFT region, regions of the gate line 112 and the data line 115, and a light leakage generation region therearound to block those regions.

The black matrix 122 can be formed using metal having optical density of 3.5 or more such as $CrO_x$ and Cr, or a carbon-based organic material, for example.

A red color filter 123 containing pigment realizing red color is formed on the red subpixel Pr on the second substrate 121.

A green color filter 123 containing pigment realizing green color is formed on the green subpixel Pg on the second substrate 121.

A blue color filter 123 containing pigment realizing blue color is formed on the blue subpixel Pb on the second substrate 121.

A white color filter formed of a transparent insulating material can be formed on the viewing angle controlling subpixel Pv on the second substrate 121. A color filter may not be formed on the viewing angle controlling subpixel Pv.

An overcoat layer 129 for planarizing a surface may or may not be formed on the entire surface of the second substrate 121.

A first common electrode 124 is formed on portions of the second substrate 121 corresponding to the red, green, and blue subpixels Pr, Pg, and Pb.

Referring to FIG. 5, a second common electrode 524 is insulated or separated from the first common electrode 124 on a portion of the second substrate 121 corresponding to the viewing angle controlling subpixel Pv.

The first common electrode 124 includes at least one of ITO and IZO.

The second common electrode 524 includes at least one of ITO and IZO.

The second common electrode 524 is electrically connected to a common line 525 to receive a common signal.

The common line 525 can be formed to correspond to the gate line formed on the first substrate 111.

The second common electrode 524 may cover a portion of the common line 525 so that the second common electrode 524 is connected to the common line 525, or the second common electrode 524 is connected to the common line 525 via a separate contact hole while they are insulated from each other.

The common line 525 is not connected to the first common electrode 124, but separated by a predetermined distance from the first common electrode 124. Preferably, the common line 525 is insulated from the first common electrode 124.

Particularly, in the case where the red, green, and blue subpixels Pr, Pg, and Pb, and the viewing angle controlling subpixel Pv are arranged in a quad type of two rows and two columns, the common line 525 overlaps the first common electrode 124. Accordingly, an insulating layer needs to be interposed between the common line 525 and the first common electrode 124.

The second common electrode 524 and the common line 525 for driving the viewing angle controlling subpixel Pv are formed separately to drive and delicately control the viewing angle controlling subpixel Pv separately from the red, green, and blue subpixels Pr, Pg, and Pb. According to an embodiment, the red, green, and blue subpixels Pr, Pg, and Pb, and the viewing angle controlling subpixel Pv are formed in one common electrode, and driving of the viewing angle controlling subpixel Pv can be controlled using the second pixel electrode 517 formed on the first substrate 111.

The common line 525 includes at least one of ITO and IZO having excellent light transmittance.

Also, the common line 525 can include at least one of Cu, Al, an aluminum alloy (for example, AlNd), Mo, Cr, Ti, Ta, MoW, and an alloy thereof.

A second alignment layer 172 is formed the front surface of the second substrate 121.

Portions of the second alignment layer 172 corresponding to the red, green, and blue subpixels Pr, Pg, and Pb are aligned to the second alignment direction.

A portion of the second alignment layer 172 corresponding to the viewing angle controlling subpixel Pv is aligned to the fourth alignment direction.

An angle difference between the second alignment direction and the fourth alignment direction may be ±45°.

The first alignment direction of the first alignment layer 171 may be perpendicular to that of the second alignment layer 172.

Also, the third alignment direction of the first alignment layer 171 may be opposite to or coincide with the fourth alignment direction of the second alignment layer 172.

Therefore, since the portions of the first alignment layer 171 corresponding to the red, green, and blue subpixels Pr, Pg, and Pb have an alignment direction perpendicular to the alignment direction of the portions of the second alignment layer 172 corresponding to the red, green, and blue subpixels Pr, Pg, and Pb, LC molecules 132a of the LC layer 131 interposed between them have a twist angle of 90° and are arranged continuously.

Also, since the portion of the first alignment layer 171 corresponding to the viewing angle controlling subpixel Pv has an alignment direction that coincides with the alignment direction of the portion of the second alignment layer 172 corresponding to the viewing angle controlling subpixel Pv, LC molecules 132b of the LC layer 131 interposed between them are arranged in the same direction as the coinciding alignment direction.

Referring to FIG. 4, a first polarizer 161 is disposed on the outer surface of the first substrate 111, and a second polarizer 162 is disposed on the outer surface of the second substrate 121.

An angle difference between a first transmission axis of the first polarizer 161 and the first alignment direction of the first alignment layer 171 is ±45°, and an angle difference between a second transmission axis of the second polarizer 162 and the second alignment direction of the second alignment layer 172 is ±45°.

Also, the first transmission axis of the first polarizer 161 may be perpendicular to the second transmission axis of the second polarizer 162.

The LCD device can be selectively driven in a wide viewing angle mode and a narrow viewing angle mode.

During the wide viewing angle mode, the viewing angle controlling subpixel of the LCD device is not driven, and a black voltage is applied to the second pixel electrode 517, or a voltage is not applied, so that a black state is shown.

During the narrow viewing angle mode, the viewing angle controlling subpixel of the LCD device is driven, a proper voltage is applied to the second pixel electrode 517 of the viewing angle controlling subpixel Pv, a vertical electric field is generated to a portion of the LC layer corresponding to the viewing angle controlling subpixel Pv to allow the LC molecules 132b to erect. Accordingly, a screen viewed by the front side maintains a black state regardless of voltage application, and phase delay of light is generated at an inclination angle by birefringence of the LC molecules 132b, so that light leakage is generated at left and right viewing angles.

The LC molecules 132b of the viewing angle controlling subpixel Pv are initially aligned to the third and fourth alignment directions, and the initial alignment direction of the LC molecules 132b is perpendicular to the first transmission axis of the first polarizer 161 and the second transmission axis of the second polarizer 162. Accordingly, when the viewing angle controlling subpixel Pv is not driven, light is blocked by the second polarizer 162 and a black state is viewed.

Also, when the viewing angle controlling subpixel Pv is driven, a predetermined voltage is applied to the second pixel electrode 517 and the second common electrode 524, so that a vertical electric field is generated between the second pixel electrode 517 and the second common electrode 524. Accordingly, the LC molecules 132b are erected, and light that has passed through the first transmission axis of the polarizer is delayed in its phase by the LC molecules to pass through the second transmission axis of the second polarizer, and is viewed as light leakage at a lateral viewing angle.

Though not shown, the LCD device according to an embodiment includes a first controller for driving the red, green, and blue subpixels Pr, Pg, and Pb to provide a desired image, and a second controller for driving the viewing angle controlling subpixel Pv to allow the image to be viewed at only a desired viewing angle.

The second controller can control a range of the viewing angle by controlling the intensity of an electric field applied to the viewing angle controlling subpixel Pv.

Figure 6A:
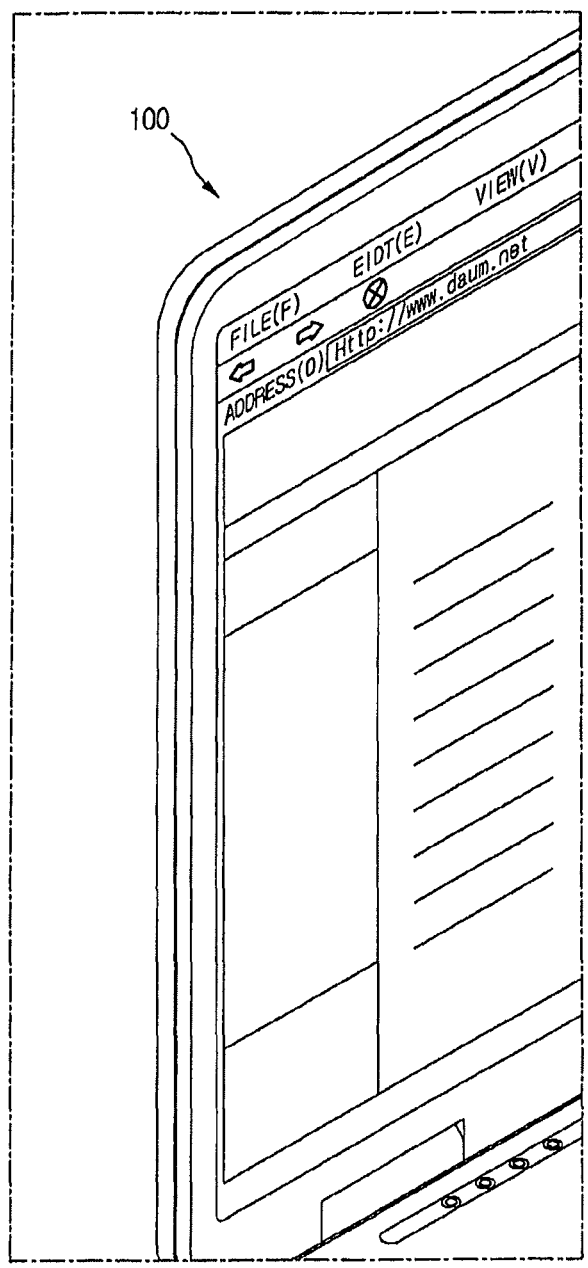
FIG. 6A is a view illustrating a screen of a wide viewing angle mode LCD device according to an embodiment, viewed by a lateral viewing angle.
Figure 6B:
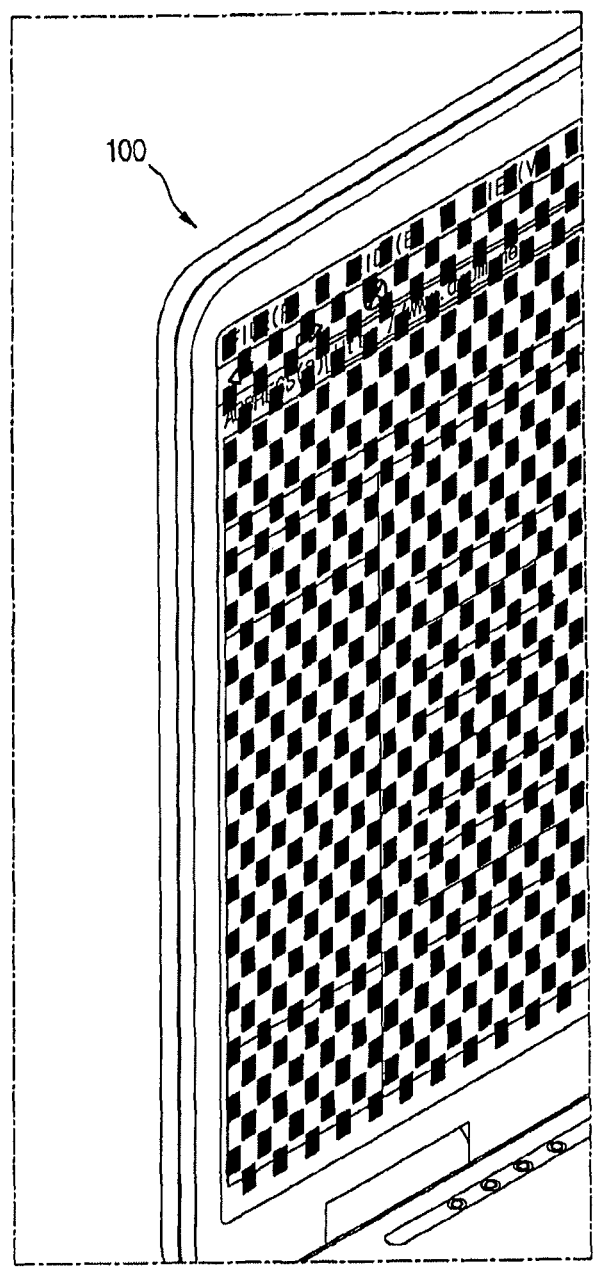
FIG. 6B is a view illustrating a screen of a narrow viewing angle mode LCD device according to an embodiment, viewed by a lateral viewing angle.

FIG. 6A is a view illustrating a screen of a wide viewing angle mode LCD device according to an embodiment, viewed by a lateral viewing angle, and FIG. 6B is a view illustrating a screen of a narrow viewing angle mode LCD device according to an embodiment, viewed by a lateral viewing angle.

In the case where the LCD device 100 is driven to realize an image, as the LC molecules 132a of the LC layer 131 in the red, green, and blue subpixels Pr, Pg, and Pb continuously arranged with a twist angle of 90° erect, the twisting of the LC molecules is released, and thus a phase delay value of the LC layer 131 changes, so that a desired image can be realized.

In the case where the viewing angle controlling subpixel Pv is controlled in the wide viewing angle mode while the LCD device 100 is driven to realize the image, a black voltage is or is not applied to the viewing angle controlling subpixel Pv. At this point, since the LC molecules 132b of the LC layer 131 in the viewing angle controlling subpixel Pv maintain arranged in the direction coinciding with the third and fourth alignment directions, the LC molecules 132b directly transmit light that passes through the first polarizer 161 and is incident onto the LC layer 131, and the light that has passed through the LC layer 131 is blocked by the second polarizer 162, so that a black state is viewed. The first transmission axis of the first polarizer 161 and the second transmission axis of the second polarizer 162 are perpendicular to each other. Therefore, the viewing angle controlling subpixel Pv does not have an influence on an image realized by the red, green, and blue subpixels Pr, Pg, and Pb, so that the LCD device 100 provides a reasonable image that can be viewed at not only a front viewing angle, but also a laterals viewing angle (wide viewing angle mode. Refer to FIG. 6A).

Here, a fact that a black voltage is or is not applied to the viewing angle controlling subpixel Pv means that the black voltage is or is not applied to the second pixel electrode 517 so that an electric field is not applied to a portion of the LC layer corresponding to the viewing angle controlling subpixel Pv.

In the case where the viewing angle controlling subpixel Pv is controlled in the narrow viewing angle mode while the LCD device 100 is driven to realize the image, a white voltage or a voltage lower than the white voltage is applied to the viewing angle controlling subpixel Pv. At this point, as the LC molecules 132b of the LC layer 131 in the viewing angle subpixel Pv arranged along a direction coinciding with the third and fourth alignment directions erect, light that has passed through the first polarizer 161 passes through the LC layer 131 and the second polarizer 162 to generate light leakage to the LCD device 100. Particularly, light leakage is generated to left and right lateral viewing angles of the LCD device 100 by controlling a voltage level applied to the viewing angle controlling subpixel Pv. That is, since the front transmission state of the viewing angle controlling subpixel Pv maintains a black state regardless of voltage application, an image is clearly viewed at the front viewing angle as the red, green, and blue subpixels Pr, Pg, and Pb are driven. On the other hand, light leakage is generated at inclined angles by a phase delay value as a voltage is applied and a contrast ratio reduces, so that the screen of the LCD device 100 is not clearly viewed at lateral viewing angles.

Figure 7A:
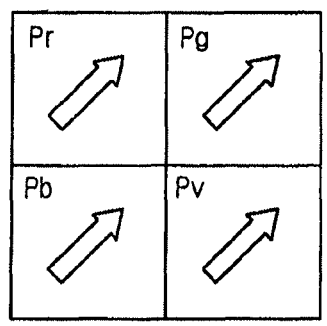
FIGS. 7A to 7C are schematic plan views illustrating a process for differently aligning a second alignment direction of red, green, and blue subpixels and a fourth alignment direction of a viewing angle controlling subpixel in a second substrate of an LCD device according to an embodiment.
Figure 7B:
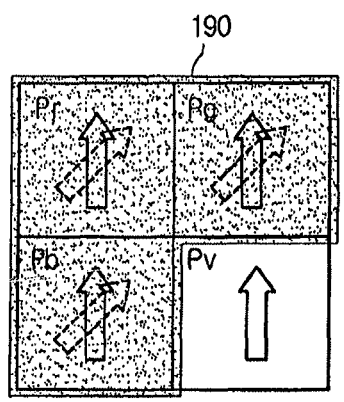
Figure 7C:
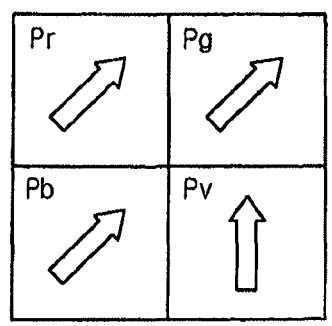

FIGS. 7A to 7C are schematic plan views illustrating a process for differently aligning a second alignment direction of red, green, and blue subpixels and a fourth alignment direction of a viewing angle controlling subpixel in a second substrate of an LCD device according to an embodiment.

Referring to FIG. 7A, the red, green, and blue subpixels Pr, Pg, and Pb, and the viewing angle controlling subpixel Pv are defined on the second substrate 121.

The red, green, and blue subpixels Pr, Pg, and Pb, and the viewing angle controlling subpixel Pv can be arranged in a quad type, or a stripe type.

Also, the viewing angle controlling subpixel Pv can be disposed at random, and the red, green, and blue subpixels Pr, Pg, and Pb can be arranged in various configurations.

The second alignment layer 172 is formed on the second substrate 121.

The front surface of the second alignment layer 172 is aligned to the second alignment direction.

Therefore, the alignment direction of portions of the second alignment layer 172 corresponding to the red, green, and blue subpixels Pr, Pg, and Pb, and the alignment direction of a portion of the second alignment layer 172 corresponding to the viewing angle controlling subpixel Pv have the second alignment direction.

After that, referring to FIG. 7B, a mask 190 having a blocking portion and an opening portion is disposed on the second alignment layer 172 aligned to have the second alignment direction.

The blocking portion of the mask 190 corresponds to the red, green, and blue subpixels, and the opening of the mask 190 corresponds to the viewing angle controlling subpixel.

Also, only a portion of the second alignment layer 172 corresponding to the opening portion of the mask 190, that is, the portion corresponding to the viewing angle controlling subpixel Pv is aligned to a fourth alignment direction.

The mask 190 is removed.

By doing so, referring to FIG. 7C, portions of the second alignment layer 172 corresponding to the red, green, and blue subpixels Pr, Pg, and Pb are aligned to have the second alignment direction, and the portion of the second alignment layer 172 corresponding the viewing angle controlling subpixel is aligned to have the fourth alignment direction.

The above-described aligning method and other aligning method will be described.

The front surface of the second alignment layer 172 is aligned to the fourth alignment direction.

The mask 190 having the blocking portion only at a portion corresponding to the viewing angle controlling subpixel Pv is disposed on the portion of second alignment layer 172 aligned to the fourth alignment direction.

Portions of the second alignment layer 172 corresponding to the mask 190 are aligned to the second alignment direction.

When the mask 190 is removed, the portions of the second alignment layer 172 corresponding to the red, green, blue subpixels Pr, Pg, and Pb are aligned to have the second alignment direction, and the portion of the second alignment layer 172 corresponding to the viewing angle controlling subpixel Pv is aligned to have the fourth alignment direction.

An angle difference between the first alignment direction and the fourth alignment direction may be ±45°.

The first alignment layer 171 on the first substrate 111 of the LCD device can be aligned according to the above-described method.

Portions of the first alignment layer 171 corresponding to the red, green, and blue subpixels Pr, Pg, and Pb is aligned to the first alignment direction, and a portion of the first alignment layer corresponding to the viewing angle controlling subpixel Pv is aligned to the third alignment direction.

An angle difference between the first alignment direction and the third alignment direction may be ±45°.

Various methods such as a rubbing method, a light illuminating method, and an ion beam illuminating method can be used for a method for aligning the alignment layer. Also, the various methods can be mixed.

For example, a first alignment process can be performed by aligning an alignment layer using the rubbing method, and a second alignment process can be performed by disposing a mask on a portion of the alignment layer and illuminating light thereto.

For another example, a first alignment process can be performed by aligning an alignment layer using a rubbing method, and a second alignment process can be performed by disposing a mask on a portion of the alignment layer and illuminating an ion beam thereto.

For still another example, a first alignment process can be performed by aligning an alignment layer using a light illuminating method, and a second alignment process can be performed by disposing a mask on a portion of the alignment layer and illuminating an ion beam thereto.

For still another example, a first alignment process can be performed by aligning an alignment layer using a light illuminating method, and a second alignment process can be performed by disposing a mask on a portion of the alignment layer and using a rubbing method.

For still another example, a first alignment process can be performed by illuminating an ion beam to an alignment layer to align the alignment layer, and a second alignment process can be performed by disposing a mask on a portion of the alignment layer and using a rubbing method.

Besides, various methods can be applied to a multi-domain structure where an alignment layer is aligned to different alignment directions.

Figures 8, 9A:
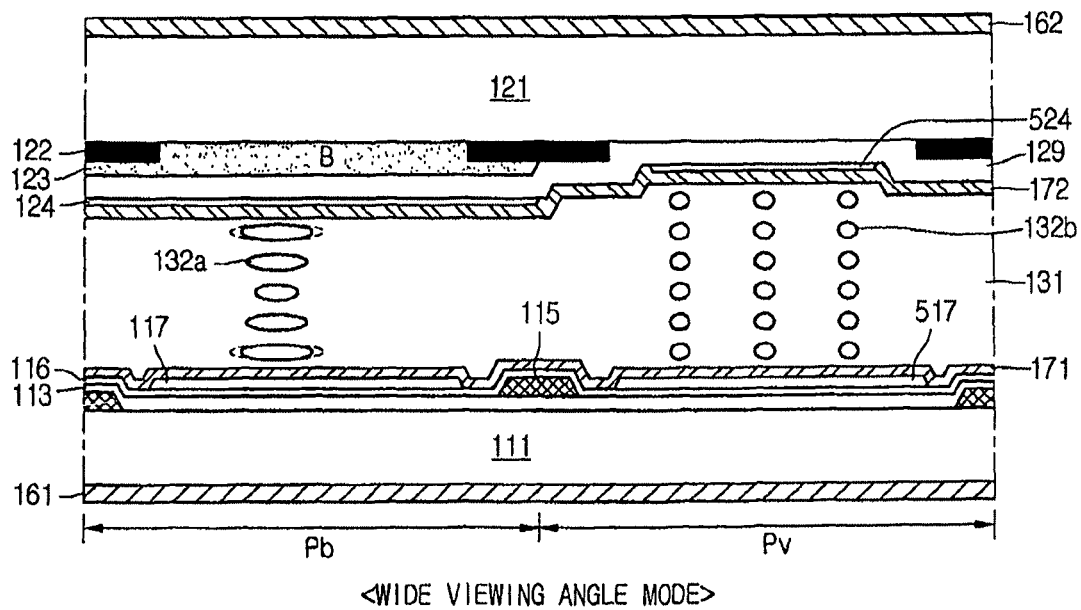
FIG. 8 is a table illustrating an example of the transmission axis of a polarizer and the alignment direction of an alignment layer in an LCD device according to an embodiment.
FIGS. 9A and 9B are cross-sectional views illustrating an LCD device is driven in a wide viewing angle mode according to an embodiment.

FIG. 8 is a table illustrating an example of the transmission axis of a polarizer and the alignment direction of an alignment layer in an LCD device according to an embodiment.

The first polarizer 161 is disposed on the outer surface of the first substrate 111, and the second polarizer 162 is disposed on the outer surface of the second substrate 121 in the LCD device.

The first polarizer 161 has a first polarization axis, and the second polarizer 162 has a second polarization axis. The first transmission axis may be perpendicular to the second transmission axis.

The first alignment layer 171 is formed on the inner surface of the first substrate 111, and the second alignment layer 172 is formed on the inner surface of the second substrate 121.

Portions of the first alignment layer 171 corresponding to the red, green, and blue subpixels Pr, Pg, and Pb are aligned to the first alignment direction, and portions of the second alignment layer 172 corresponding to the red, green, and blue subpixels Pr, Pg, and Pb are aligned to the second alignment direction.

A portion of the first alignment layer 171 corresponding to the viewing angle controlling subpixel Pv is aligned to the third alignment direction, and a portion of the second alignment layer 172 corresponding to the viewing angle controlling subpixel Pv is aligned to the fourth alignment direction.

The first alignment direction may be perpendicular to the second alignment direction.

The third alignment direction may be opposite to or coincide with the fourth alignment direction.

An angle difference between the first alignment direction and the third alignment direction may be ±45°.

An angle difference between the second alignment direction and the fourth alignment direction may be ±45°.

Relations between the first transmission axis of the first polarizer 161, the first alignment direction and the third alignment direction of the first alignment layer 171, the second alignment direction and the fourth alignment direction of the second alignment layer 172, and the second transmission axis of the second polarizer 162 are described below using an example.

Assuming that the first transmission axis of the first polarizer 161 is 0°, the first alignment direction has an alignment axis of −45° with respect to the first transmission axis.

Also, the second alignment direction of the second alignment layer 172 facing the first alignment layer 171 has an alignment axis of +90° with respect to the first alignment direction.

Since the second transmission axis of the second polarizer 162 has a transmission axis of +90° with respect to the first transmission axis, the second alignment direction of the second alignment layer 172 has an alignment axis of −45° with respect to the second transmission axis.

Accordingly, portions of the LC layer 131 corresponding to the red, green, and blue subpixels Pr, Pg, and Pb are arranged in a TN method to have a twist angle of 90° with respect to a transmission direction of light.

The third alignment direction of the first alignment layer 171 has an alignment axis of −90° with respect to the first transmission axis.

Also, the fourth alignment direction of the second alignment layer 172 facing the first alignment layer 171 has an alignment axis of +180° with respect to the third alignment direction.

Consequently, the alignment directions of the third alignment direction and the fourth alignment direction coincide with each other, and the fourth alignment direction and the second transmission axis of the second polarizer coincide with each other.

Accordingly, the directors of LC molecules 132b in the LC layer of the viewing angle controlling subpixel Pv are arranged to be perpendicular to the first transmission axis of the first polarizer 161, and horizontal to the transmission axis of the second polarizer 162, the LC molecules 132b erect with respect to the surface of the substrate to generate phase delay when a voltage is applied.

The first and second polarizers 161 and 162 disposed on the outer surfaces of the first and second substrates 111 and 121, respectively, are disposed such that the transmission axes of the first and second polarizers 161 and 162 are perpendicular to each other. A portion of the alignment layer corresponding to the viewing angle controlling subpixel Pv has an alignment direction parallel to the transmission axis of one of the first and second polarizers 161 and 162.

Meanwhile, the cell gap of the viewing angle controlling subpixel Pv is equal to or greater than those of the red, green, and blue subpixels Pr, Pg, and Pb.

The LCD device having the above-described construction is driven in a wide viewing angle mode and a narrow viewing angle mode. During the wide viewing angle mode, a black voltage is or is not applied to the viewing angle controlling subpixel Pv.

During the narrow viewing angle mode, a proper voltage is applied to the second pixel electrode 517 of the viewing angle controlling subpixel Pv. At this point, since a vertical electric field is generated to the viewing angle controlling subpixel Pv to allow LC molecules 132b to perpendicularly move to the first substrate, a transmission state at the front maintains a black state regardless of voltage application, and light leakage is generated to an inclined angle as a voltage is applied.

An LCD device operating in a wide viewing angle mode and an LCD device operating in a narrow viewing angle mode are described below in detail.

FIG. 9A is a cross-sectional view of an LCD device operating in a wide viewing angle mode according to an embodiment.

Figure 9B:
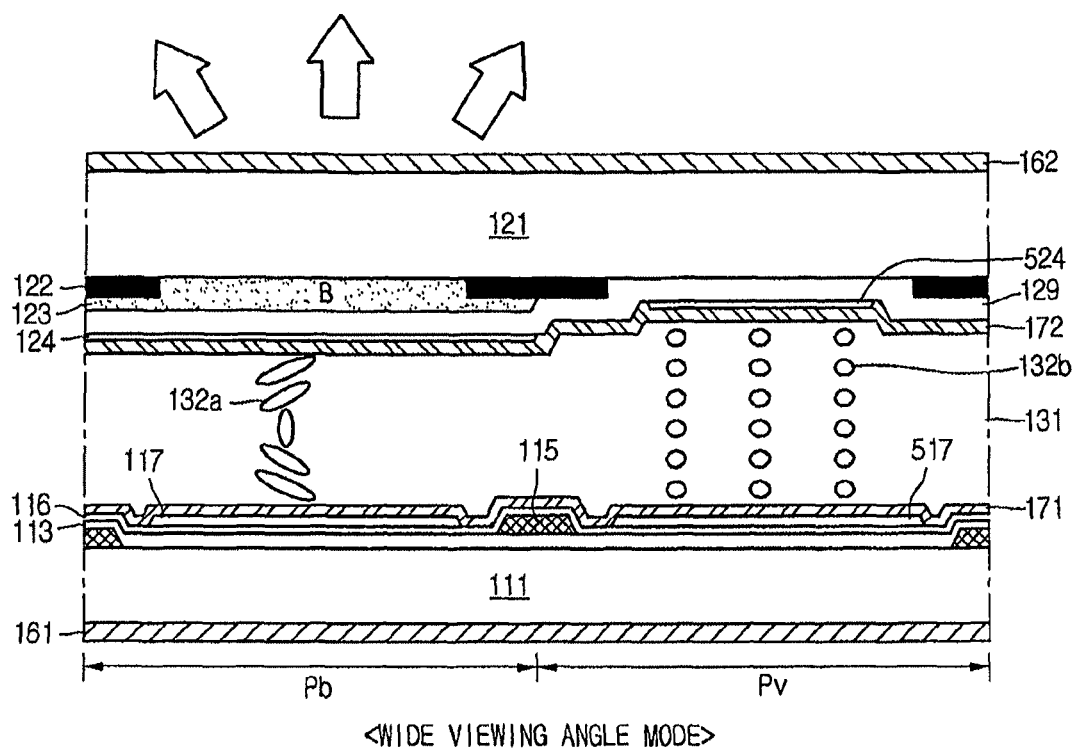

FIG. 9B is a cross-sectional view of an LCD device operating in a wide viewing angle mode according to an embodiment.

The LCD device according to an embodiment includes the first substrate 111, the second substrate 121, and the LC layer 131 interposed between the first and second substrates 111 and 121. A red subpixel Pr, a green subpixel Pg, a blue subpixel Pb, and a viewing angle controlling subpixel Pv are defined.

The red, green, and blue subpixels Pr, Pg, and Pb are driven in a TN mode, and the viewing angle controlling subpixel Pv is driven in an ECB mode.

When the viewing angle controlling subpixel Pv is in an off-state, the LCD device is driven in the wide viewing angle mode by the red, green, and blue subpixels Pr, Pg, and Pb.

In the LCD device, a black voltage is applied to the viewing angle controlling subpixel Pv so that the viewing angle controlling subpixel Pv becomes a black state. When a voltage is not applied to the red, green, and blue subpixels Pr, Pg, and Pb, a white state is displayed on the whole by a twist arrangement of the LC molecules 132a.

Referring to FIG. 9A, when a voltage is not applied to the red, green, and blue subpixels Pr, Pg, and Pb during the wide viewing angle mode, light directly passes through due to a twist arrangement of the LC molecules 132a, so that a normally white state is viewed.

Here, since the LCD device is driven in the wide viewing angle mode, a voltage is or is not applied to the viewing angle controlling subpixel Pv and a black state is displayed.

Referring to FIG. 9B, a voltage is applied to the red, green, and blue subpixels Pr, Pg, and Pb during a wide viewing angle mode, so that a gray scale is displayed on a screen.

Since the LCD device is driven in the wide viewing angle mode, a black voltage is or is not applied to the viewing angle controlling subpixel Pv to display a black state. Accordingly, gray scale displayed on the screen by the red, green, and blue subpixels Pr, Pg, and Pb is directly displayed not only on a front viewing angle but also on a lateral viewing angle.

As the LC molecules 132b of the LC layer 131 in the red, green, and blue subpixels Pr, Pg, and Pb continuously arranged with a twist angle of 90° erect, the twisting is released, and accordingly, the light transmittance of the LC molecules 132a changes, so that a desired image can be realized.

During the wide viewing angle mode, a black voltage is or is not applied to the viewing angle controlling subpixel Pv.

At this point, since the LC molecules 132b of the LC layer 131 in the viewing angle controlling subpixel Pv maintain the state where the LC molecules 132b are arranged to a direction coinciding with the third and fourth alignment directions, the LC molecules 132b transmits light that passes through the first polarizer 161 and is incident to the LC layer 131, and the light that has passed through the LC layer 131 is blocked by the second polarizer 162, so that light is not transmitted through the second polarizer 162 and thus a black state is displayed.

The first transmission axis of the first polarizer 161 is perpendicular to the second transmission axis of the second polarizer 162. Therefore, since the viewing angle controlling subpixel Pv does not have an influence on an image realized by the red, green, and blue subpixels Pr, Pg, and Pb, an image is properly viewed not only at a front viewing angle, but also at a lateral viewing angle in the LCD device.

That is, during the wide viewing angle mode, the red, green, and blue subpixels Pr, Pg, and Pb become a white state when a voltage is not applied thereto, and the red, green, and blue subpixels Pr, Pg, and Pb display a gray scale uniformly over an entire viewing angle when a voltage is applied in the LCD device.

Meanwhile, while the viewing angle controlling subpixel Pv is in an on-state, the LCD device generates light leakage at the lateral viewing angle, and thus is driven in the narrow viewing angle mode.

While the viewing angle controlling subpixel Pv is driven in the narrow viewing angle mode, a viewing angle range is controlled according to at least one voltage level applied to the second pixel electrode 517.

Figure 10A:
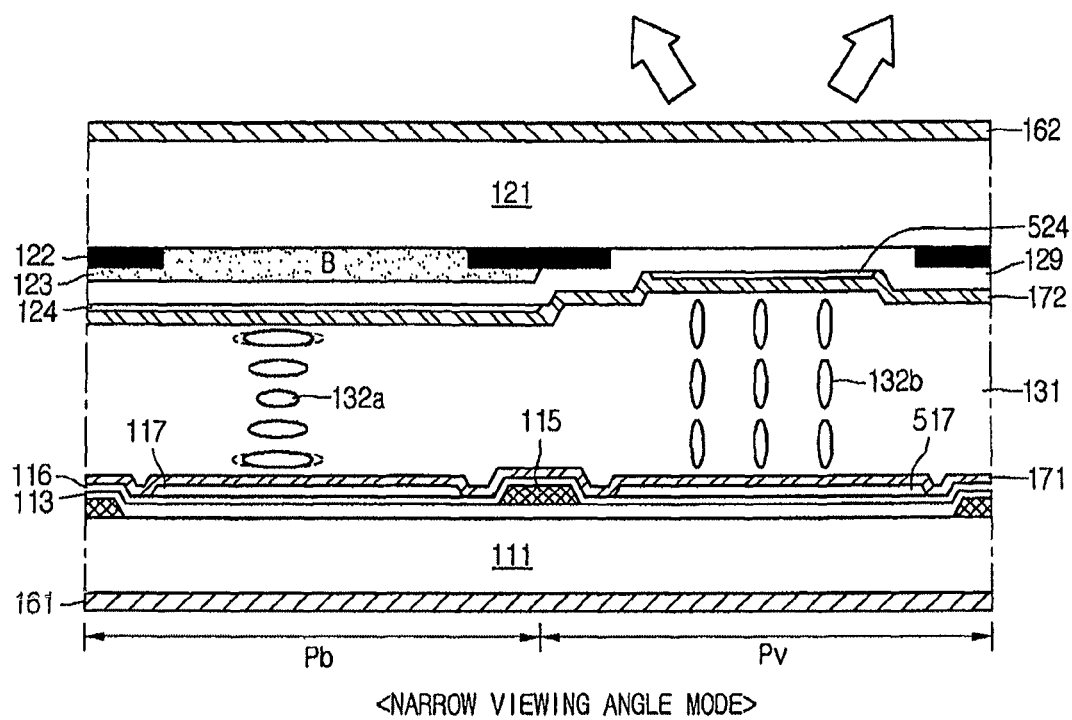
FIGS. 10A and 10B are cross-sectional views illustrating an LCD device is driven in a narrow viewing angle mode according to an embodiment.

FIG. 10A is a cross-sectional view of the LCD device of FIG. 4 operating in a narrow viewing angle mode according to an embodiment.

Figure 10B:
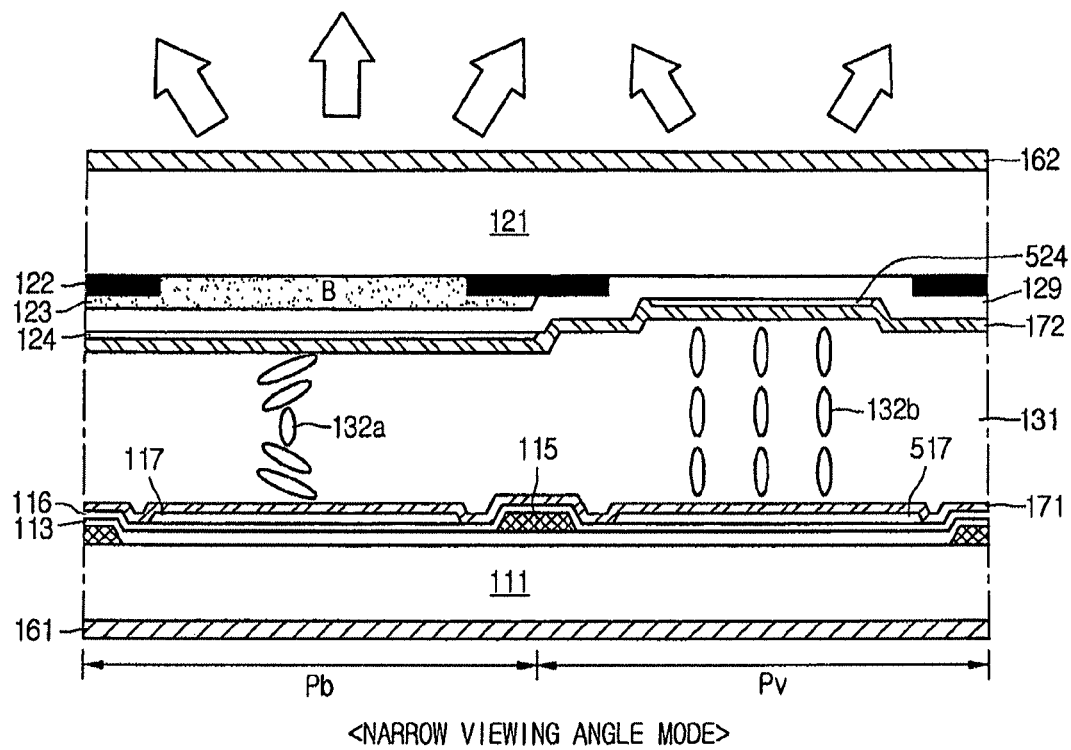

FIG. 10B is a cross-sectional view of the LCD device of FIG. 4 operating in a narrow viewing angle mode according to an embodiment.

The LCD device according to an embodiment includes the first substrate 111, the second substrate 121, and the LC layer 131 interposed between the first and second substrates 111 and 121. A red subpixel Pr, a green subpixel Pg, a blue subpixel Pb, and a viewing angle controlling subpixel Pv are defined.

The red, green, and blue subpixels Pr, Pg, and Pb are driven in a TN mode, and the viewing angle controlling subpixel Pv is driven in an ECB mode.

During the narrow viewing angle mode, since the viewing angle controlling subpixel Pv of the LCD device transmits light through the lateral sides of the screen, an image displayed by the red, green, and blue subpixels Pr, Pg, and Pb is clearly viewed at a front viewing angle but the image is not clearly viewed at the lateral viewing angles because a contrast ratio reduces due to light leakage generated by the viewing angle controlling subpixel Pv.

Referring to FIG. 10A, since an electric field is not applied to portions of the LC layer 131 corresponding to the red, green, and blue subpixels Pr, Pg, and Pb during an off0-state, the LC molecules 132a maintain an initial arrangement state where the LC molecules 132a in the LC layer 131 are continuously arranged with a twist angle of 90°, a normally white mode is displayed.

Also, since the viewing angle controlling subpixel Pv is in an on-state, the viewing angle controlling subpixel Pv transmits light through the lateral viewing angles of the LCD device.

That is, while the viewing angle controlling subpixel Pv is in the off-state, the LC molecules are arranged in the same direction as the alignment directions of the first and alignment layers 171 and 172. On the other hand, while the viewing angle controlling subpixel Pv is in the on-state, an electric field is applied to the LC layer 131 and thus the LC molecules 132b erect to transmit light through the lateral sides.

Therefore, light leakage is generated at left and right viewing angles by the erecting LC molecules 132 in the viewing angle controlling subpixel Pv, so that a contrast ratio reduces, which reduces image quality at left and right viewing angles.

Also, referring to FIG. 10B, during the on-state, twisting of an LC molecule arrangement in portions of the LC layer 131 corresponding to the red, green, and blue subpixels Pr, Pg, and Pb is released and thus erects to display a gray scale.

Also, when the viewing angle controlling subpixel Pv is in the on-state, an electric field is applied to the LC layer 131, so that the LC molecules 132b that have been aligned to the same direction as the alignment directions of the first and second alignment layers 171 and 172 erect to transmit light through the lateral sides.

Therefore, an image generated by the red, green, and blue subpixels Pr, Pg, and Pb is directly displayed at the front viewing angle, but retardation is greatly generated at the later sides by the erecting LC molecules 132 in the viewing angle controlling subpixel Pv at the left and right viewing angles, so that a contrast ratio reduces and thus image quality reduces at the left and right viewing angles.

When a voltage applied to the viewing angle controlling subpixel Pv is properly controlled during the narrow viewing angle mode, an electric field applied to a portion of the LC layer corresponding to the viewing angle controlling subpixel can be controlled, and a retardation value of the LC molecules 132 at the left and right viewing angle directions can be controlled.

Therefore, a viewing angle allowing a user to view a screen can be controlled to a desired degree by the user, and flexibility in a security range is provided to the user of the LCD device. Also, the LCD device not only can be used for one person but also can be used for two or more persons to view an image of high quality without inconvenience while securing security.

Figure 11:
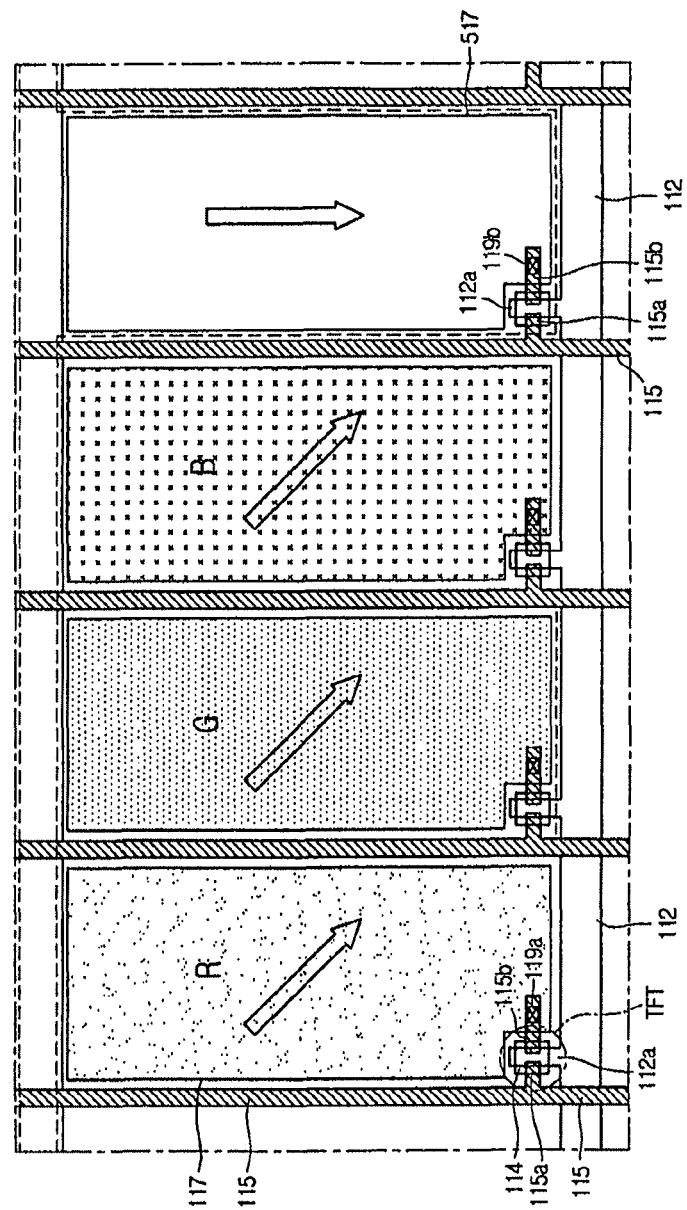
FIG. 11 is a plan view of an LCD device according to another embodiment.

FIG. 11 is a plan view of an LCD device according to another embodiment.

Referring to FIG. 11, the LCD device according to an embodiment can include red, green, and blue subpixels Pr, Pg, and Pb, and a viewing angle controlling subpixel Pv arranged in a row.

Referring to FIG. 11, the viewing angle controlling subpixel can be disposed at random, and the positions of the red, green, and blue subpixels Pr, Pg, and Pb can be also arranged in various configurations.

Figure 12:
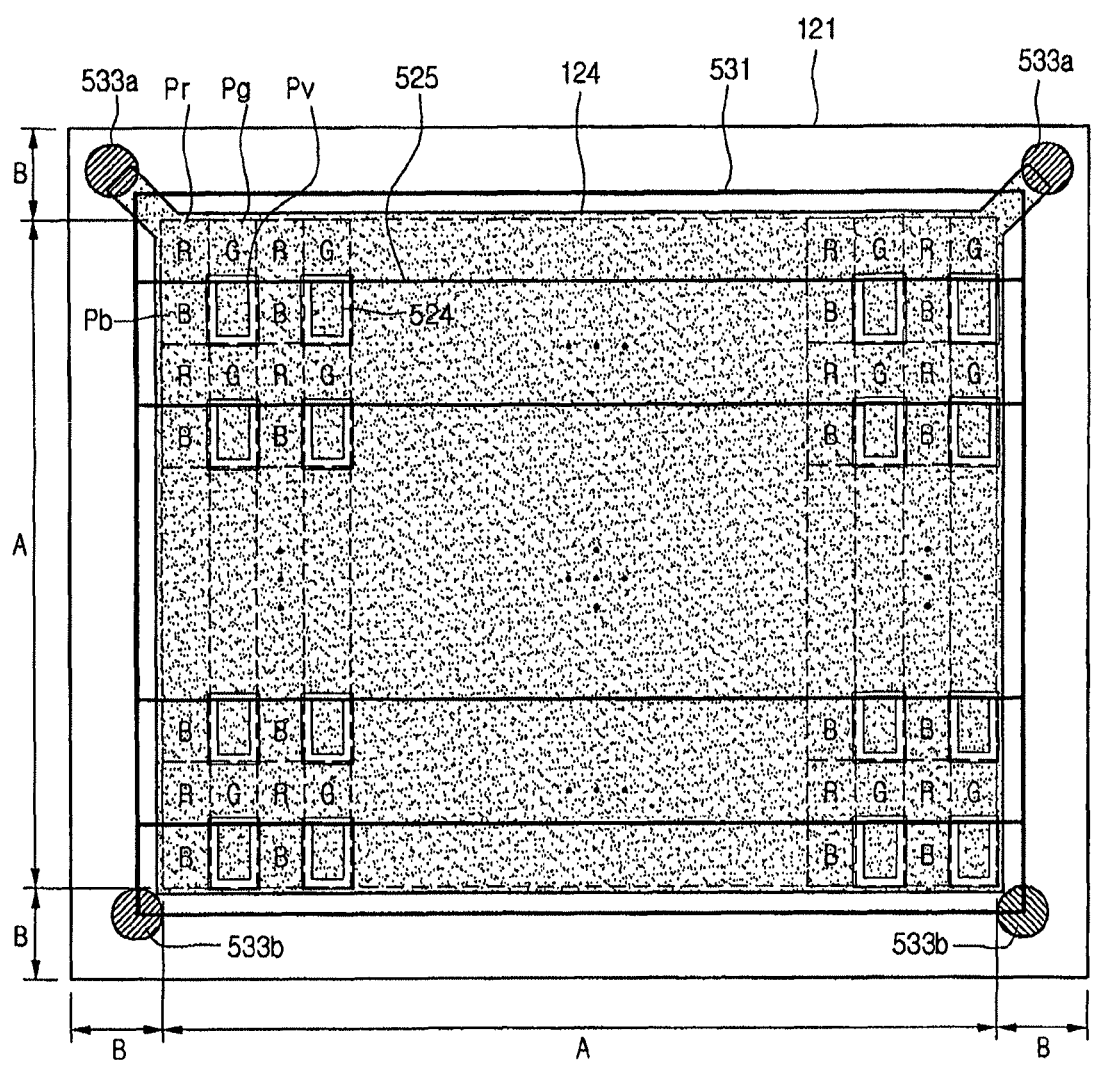
FIG. 12 is a plan view of a wiring structure of a second substrate in an LCD device according to an embodiment.

FIG. 12 is a plan view of a wiring structure of a second substrate in an LCD device according to an embodiment.

Referring to FIG. 12, the second substrate 121 is divided into a screen display region A where LCs are driven to display a screen, and an outer region B, which is a non-display region.

Red, green, and blue color filters R, G, and B are formed in the screen display region A of the second substrate 121 to correspond to red, green, and blue subpixels Pr, Pg, and Pb, respectively.

A white color filter for generating white light is or is not formed in the viewing angle controlling subpixel Pv.

A first common electrode 124 is formed on portions of the second substrate 121 corresponding to the red, green, and blue subpixels Pr, Pg, and Pb.

A second common electrode 524 is formed on a portion of the second substrate 121 corresponding to the viewing angle controlling subpixel Pv.

The first common electrode 124 and the second common electrode 524 include at least one of ITO, IZO, and ITZO.

The first common electrode 124 and the second common electrode 524 are separated from each other.

The first common electrode 124 and the second common electrode 524 can be insulated from each other by an insulating layer.

The first common electrode 124 is formed on an entire surface of the second substrate 121, and a portion of the first common electrode 124 corresponding to the viewing angle controlling subpixel Pv can be open.

The second common electrode 524 is electrically connected to a common line, which applies a common signal for viewing control to the second common electrode 524.

The common line is connected to the common signal for viewing control, and formed long over the outer region of the second substrate.

The common line can overlap the first common electrode, and an insulating material may be interposed between the common line and the first common electrode.

A conductive line can be formed along the outer region of the second substrate, and connected to the common line formed on the second substrate.

In the case where the common line 525 is formed of the same material as that of the second common electrode 524, the conductive line 531 can be collectively patterned using the same material as that of the common electrode 524 for viewing control.

Also, the conductive line 531 can be formed of a separate metal line, and the common line 525 can be connected to the conductive line 531.

The first common electrode 124 receives a common signal from a first controller of the first substrate 111. For this purpose, at least one first conducive connecting pattern 533a (for example, Ag dot) for connecting the first common electrode 124 with the first controller can be formed at a predetermined position.

For example, the first conductive connecting pattern 533a is formed between the first common electrode 124 and the first substrate 111 at the outer side of a seal pattern for attaching the first substrate 111 to the second substrate 121.

The second common electrode 524 receives a common signal for viewing control from a second controller of the first substrate 111. For this purpose, at least one second conductive connecting pattern 533b for connecting the second common electrode 524 with the second controller can be formed at a predetermined position.

The first conductive connecting pattern 533a and the second conductive connecting pattern 533b may be formed such that they do not contact each other or do not generate signal interference.

The LCD device according to an embodiment can be driven in the wide viewing angle mode or the narrow viewing angle mode. To selectively switch the LCD device to the wide viewing angle mode and the narrow viewing angle mode, a viewing angle mode switching operation is performed using a selection signal. When the wide viewing angle mode is selected by the selection signal, an electric field is not applied to a portion of the LC layer corresponding to the viewing angle controlling subpixel Pv. On the other hand, when the narrow viewing angle mode is selected, an electric field is applied to the portion of the LC layer corresponding to the viewing angle controlling subpixel Pv, so that light that has passed through the portion of the LC layer generates light leakage at the lateral viewing angles.

When the narrow viewing angle mode is selected, a proper driving voltage is applied to the viewing angle controlling subpixel Pv. The driving voltage is input from the second controller of the first substrate 111, and connected to the conductive line 531 through the second conductive connecting pattern 533b conducting the first and second substrates 111 and 121, and applied to the second common electrode 524 through the common line 525 electrically connected with the conductive line 531.

The intensity of an electric field applied to the portion of the LC layer 131 corresponding to the viewing angle controlling subpixel Pv can be controlled by controlling a common voltage applied to the second common electrode 524 and a pixel voltage applied to the second pixel electrode 517. Therefore, since retardation values of LC molecules 132b in a portion of the LC layer 131 corresponding to the viewing angle controlling subpixel Pv at left and right viewing angle directions can be controlled, an LCD device having various viewing angle ranges can be realized.

Meanwhile, various patterns that can prevent electrostatic discharge can be further connected to the conductive line 531.

Figure 13:
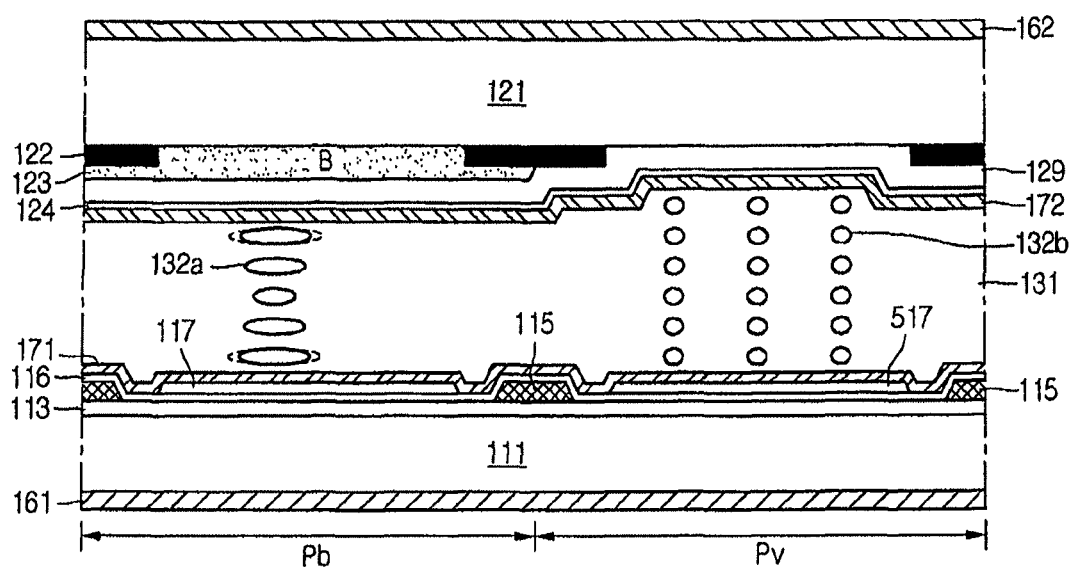
FIG. 13 is a cross-sectional view illustrating a portion of an LCD device according to another embodiment.

FIG. 13 is a cross-sectional view illustrating a portion of an LCD device according to another embodiment.

Detailed descriptions of the same parts as those of the previous embodiment are omitted, and only the characteristics of the present embodiment are described.

Referring to FIG. 13, the LCD device includes red, green, and blue subpixels Pr, Pg, and Pb, and a viewing angle controlling subpixel Pv. The red, green, and blue subpixels Pr, Pg, and Pb are driven in a TN method, and the viewing angle controlling subpixel Pv is driven in an ECB method.

One common electrode 124 can be formed on portions of a second substrate 121 corresponding to the red, green, and blue subpixels Pr, Pg, and Pb and the viewing angle controlling subpixel Pv.

A viewing angle range can be controlled by controlling a voltage applied to a second pixel electrode 517 of the viewing angle controlling subpixel Pv.

According to an embodiment, a wide viewing angle mode and a narrow viewing angle mode can be selectively realized in the LCD device, so that personal security can be secured.

According to an embodiment, a viewing angle can be controlled by making the alignment direction of the viewing angle controlling subpixel different from those of the red, green, and blue subpixels in an alignment layer of the LCD device, driving the viewing angle controlling subpixel in an ECB mode, and driving the red, green, and blue subpixels in a TN mode. Accordingly, the LCD device can be easily manufactured.

Also, according to an embodiment, a viewing angle is controlled by adding a viewing angle controlling subpixel inside an LC panel, so that a process is simplified.

Also, according to an embodiment, a separate viewing angle control layer does not need to be added, so that an LCD device having excellent light efficiency and having a lightweight and slim profile can be provided.

Also, the LCD device according to an embodiment provides flexibility in a security range to a user, and not only can be used for one person but also can be used for two or more persons to view an image of high quality without inconvenience while securing security.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method for manufacturing a liquid crystal display device, the method comprising:
    preparing first and second substrates where first to fourth subpixel regions are defined;
    forming a first alignment layer on the first substrate;
    aligning portions of the first alignment layer corresponding to the first to third subpixel regions to a first direction, and aligning a portion of the first alignment layer corresponding to the fourth subpixel region to a third direction different from the first direction;
    forming a common electrode on the second substrate;
    forming a second alignment layer on the common electrode;
    aligning portions of the second alignment layer corresponding to the first to third subpixel regions to a second direction, and aligning a portion of the second alignment layer corresponding to the fourth subpixel region to a fourth direction different from the second direction; and
    forming a liquid crystal layer between the first and second substrates,
    wherein the forming of the common electrode comprises:
        forming a first common electrode on an entire surface of the second substrate and having an open portion corresponding to the fourth subpixel region; and
        forming a common line on a black matrix of the second substrate corresponded to a gate line;
        forming a second common electrode connected to the common line on the open portion of the first common electrode and separated from the first common electrode.

2. The method according to claim 1, further comprising:
    disposing a first polarizer having a first transmission axis on an outer surface of the first substrate; and
    disposing a second polarizer having a second transmission axis on an outer surface of the second substrate.

3. The method according to claim 1, wherein the aligning of portions of the first alignment layer corresponding to the first to third subpixel regions to the first direction, and the aligning of the portion of the first alignment layer corresponding to the fourth subpixel region to the third direction different from the first direction comprises:
    aligning an entire surface of the first alignment layer to the first direction;
    disposing a mask having a blocking portion corresponding to the first to third subpixel regions, and having an opening portion corresponding to the fourth subpixel region on the first substrate;
    aligning the first alignment layer to the third direction with the mask disposed on the first substrate; and
    removing the mask.

4. The method according to claim 1, wherein the aligning of portions of the second alignment layer corresponding to the first to third subpixel regions to the second direction, and the aligning of the portion of the second alignment layer corresponding to the fourth subpixel region to the fourth direction different from the second direction comprises:
    aligning an entire surface of the second alignment layer to the second direction;
    disposing a mask having a blocking portion corresponding to the first to third subpixel regions on the second substrate, and having an opening portion corresponding to the fourth subpixel region;
    aligning the second alignment layer to the fourth direction with the mask disposed on the second substrate; and
    removing the mask.

5. The method according to claim 2, further comprising forming a conductive line connected to the common line around an outer block of the second substrate.

6. The method according to claim 5, further comprising, after the forming of the liquid crystal layer between the first and second substrates, forming a first conductive connecting pattern conducting to the conductive line, and forming a second conductive connecting pattern conducting to the first common electrode.

* * * * *